June 10, 1941.          R. A. BRADLEY ET AL          2,245,382
SPRING ASSEMBLY FOR TANK VEHICLES
Filed Feb. 8, 1940

INVENTORS
Ralph A. Bradley
Doyle D. Buttolph
BY
ATTORNEY

UNITED STATES PATENT OFFICE 2,245,382

SPRING ASSEMBLY FOR TANK VEHICLES

Ralph A. Bradley and Doyle D. Buttolph, Kansas City, Mo., assignors to Butler Manufacturing Company, Kansas City, Mo., a corporation of Missouri Application February 8, 1940, Serial No. 317,847

5 Claims. (Cl. 267—38)

Our invention relates to a spring assembly for tank vehicles.

A spring sufficient to carry a heavy load must be provided in truck tank assemblies. Due to the fact that many State laws limit the total weight of the load which may be carried on the State roads, truck tank manufacturers have designed truck tank constructions in which the tank itself is of comparatively light weight in order that the trucker may increase the pay load.

When the tank is empty there is excessive vibration due to the heavy springs which must be employed to carry the load when the tank is full. This vibration is the primary cause in most tank failures causing crystallization of the metal of the tank and frequently leakage with ensuing fire hazard where gasoline and oil are being carried.

One object of our invention is to provide a truck tank spring assembly in which the tank when empty rides on a comparatively light spring, doing away with the destructive vibration which would otherwise take place with the empty tanks.

Another object of our invention is to provide a truck tank spring assembly which will reduce the forward and backward motion of the axle due to spring deflection when the tank is loaded.

Still another object of our invention is to provide an assembly in which the need for grease is eliminated.

A further object of our invention is to provide a spring assembly in which there is an ample load carrying capacity provided when the tank is full, to reduce excessive tank sway.

A still further object of our invention is to provide a spring assembly in which a plurality of full length spring leaves act to position the axle.

Other and further objects of our invention will appear from the following description.

In the accompanying drawing which forms part of the instant specification, and which is to be read in conjunction therewith, and in which like reference numerals are used to indicate like parts in the various views.

Figure 1:
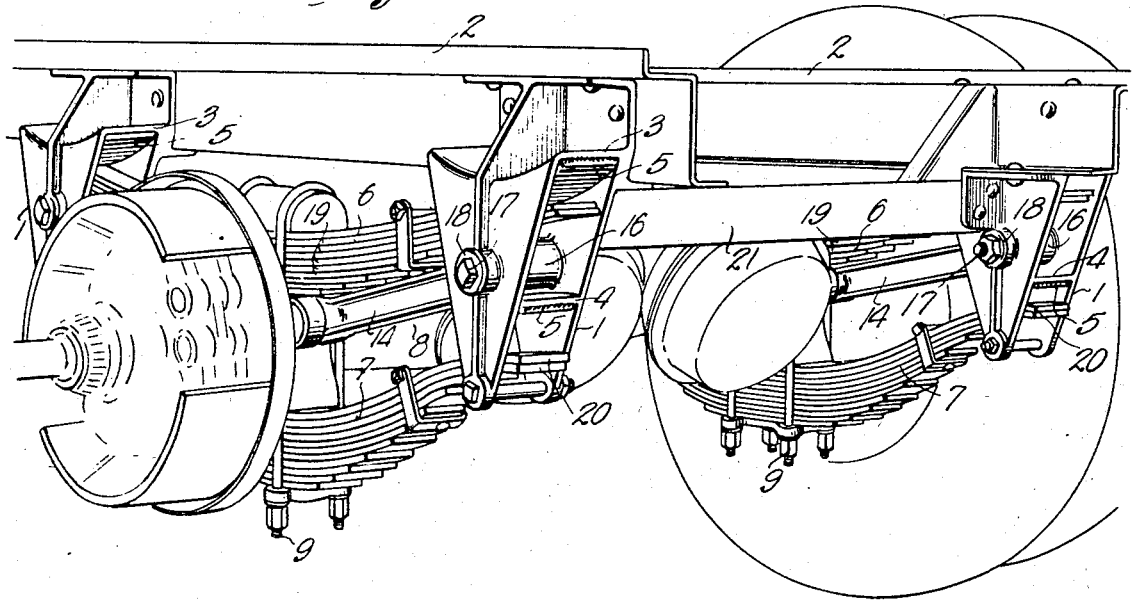
Fig. 1 is a perspective view of a rear wheel assembly adapted to support the after end of a trailer or truck tank showing one embodiment of our invention.
Figure 2:
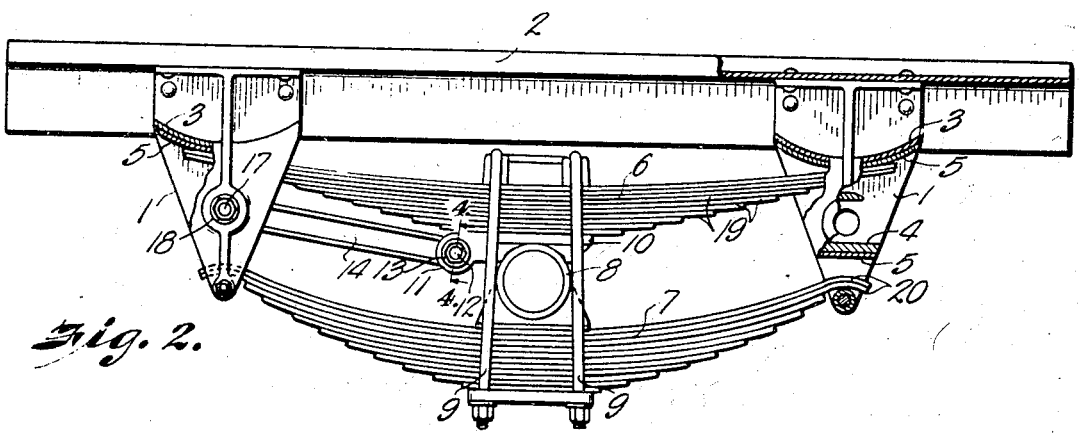
Fig. 2 is a side elevation of the spring assembly of our invention.
Figure 3:
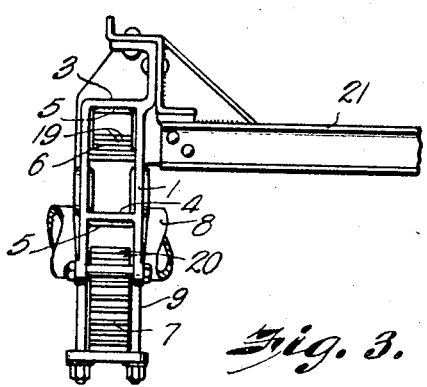
Fig. 3 is an end view of the spring assembly shown in Fig. 2.
Figure 4:
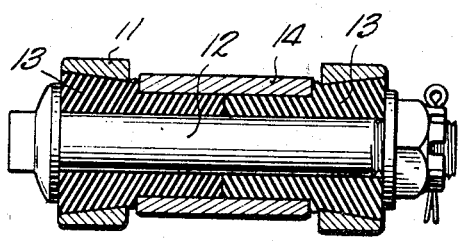
Fig. 4 is an enlarged sectional view taken on the line 4—4, Fig. 2.

In general, our invention contemplates the provision of chafing plate assemblies 1, to which sills 2 are secured. The chafing plate assemblies carry upper chafing plates 3 and lower chafing plates 4. The surfaces of the chafing plates may be covered with a layer of mild steel 5.

The spring assembly comprises an upper light spring 6 and a lower heavy spring 7 clamped to the axle 8 by means of clamping U-bolts 9. A saddle 10 is positioned in the assembly over the axle and below the upper light spring 6, and is provided at one end with a bearing member 11.

A pivot pin 12 is provided with rubber bushings 13, and pivotally connects a link 14 to the bearing 11. The other end of the link 14 is pivotally secured in a bearing 16 by means of pin 17. Rubber bushings 18, similar to bushings 13, are positioned around the pin 17. The upper light spring is composed of a plurality of leaves 19, the upper two of which are full length and rest against chafing plates 3. The weight of the empty tank is transmitted to the sills 2 thence to the chafing plate assemblies 1, to chafing plates 3, to spring 6 and to the axle 8, and thence to the ground wheels.

When the tank is loaded the spring 6 will deflect, allowing the chafing plate assemblies 1 to move downwardly. When this occurs, the lower chafing plates 4 will engage the full length leaves 20 of the lower spring 7, and the load will be thus borne by both springs 6 and 7. The link 14 limits the motion and transmits the thrust of the ground wheels to the sills 2, in the case of a truck tank. In the case of a trailer tank, the drag is taken up through the link and thus the spring assembly is not displaced. The links 14 are built to withstand a far greater stress than will ever be encountered in use. The arrangement is such that when the tank is loaded the links are practically level. This reduces to a minimum the forward and backward motion of the axle due to spring deflection under varying load conditions. The rubber mounting bushings 13 and 18 eliminate the need for grease and neutralize vibration. The upper spring has a very low carrying capacity so that when the tank unit is empty, only the upper spring will carry the load, and enable the reduction or elimination of the destructive empty tank vibration. The lower spring 7 of maximum capacity comes into contact with its chafing plates 4 only after the tank is loaded. The springs 7 are sufficiently heavy to handle the full axle rating stopping excessive tank sway. The upper leaves of each spring extend through the chafing plate assemblies 1. The width of the upper spring leaves is such that they are nearly the same as the interior dimension of the chafing plate assembly. This enables the steering of the axle to be done by the action of the sides of the spring leaves on the sides of the chafing plate assembly.

The mild steel chafing surfaces 5 may be easily removed and replaced. This relieves wear on the chafing plate brackets and on the springs proper.

Opposite chafing plate assemblies are tied together by cross members 21. This eliminates side movement due to the steering of the vehicle.

It will be seen that we have accomplished the objects of our invention. We have provided a novel spring assembly for truck and trailer vehicles in which we are enabled to eliminate vibration with the tank empty, thus reducing to a minimum the principal cause of failure in the tank vehicles of the prior art.

It will be understood that certain features and sub-combinations are of utility and may be employed without reference to other features and sub-combinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, we claim:

1. A spring assembly including in combination an axle, a nest of spring leaves above said axle, a nest of spring leaves below said axle, means for clamping said spring nests to said axle, vehicle body supporting means, chafing plate assemblies supporting said last named means, said chafing plate assemblies comprising upper chafing plates and lower chafing plates, said upper spring nest normally contacting said upper chafing plates and supporting the load upon said axle, said lower spring nest normally positioned out of contact with said lower chafing plates, a link pivotally connecting said axle and one of said chafing plate assemblies, the arrangement being such that when a heavy load is supported by said spring assembly, the upper spring nest will flex to permit the load to be carried by said lower spring nest through said lower chafing plates.

2. A spring assembly as in claim 1 including in combination a pin secured to said axle, a pin secured to one of said chafing plate assemblies, said link formed with bearings at each end, said pins passing through said bearings, and rubber bushings between each of said pins and said bearings.

3. A spring assembly as in claim 1 in which said upper spring nest is of smaller capacity than said lower spring nest.

4. A spring assembly as in claim 1 in which chafing plate assemblies on opposite sides of the vehicle are interconnected by tie members.

5. A spring assembly as in claim 1 in which said link is substantially horizontal when the load is borne by both spring nests.

RALPH A. BRADLEY.
DOYLE D. BUTTOLPH.